TUNABLE BANDPASS FILTER

Filed Feb. 23, 1965

INVENTOR.
PHILIP S. CARTER

BY

Paul B. Fike
PATENT AGENT

United States Patent Office 3,400,343
Patented Sept. 3, 1968

3,400,343
TUNABLE BANDPASS FILTER

Philip S. Carter, Palo Alto, Calif., assignor to Physical Electronics Laboratories, San Mateo, Calif., a corporation of California Filed Feb. 23, 1965, Ser. No. 434,551
14 Claims. (Cl. 333—73)

This invention relates generally to electrical filters, and more particularly, to bandpass filters operable in the microwave frequency portion of the elctromagnetic energy spectrum and capable of being tuned over a rather broad frequency range.

In a copending patent application, Ser. No. 365,990, filed May 8, 1964, and assigned to the same assignee of this application, a tunable bandpass filter is described using ferrite resonators for transmitting energy at the desired frequencies with little or no attenuation while at the sametime providing great attenuation of energy at other frequencies.

In all embodiments of the invention described in the above identified copending application, electromagnetic energy at the desired frequencies was directly coupled from one ferrite resonator located in the input portion of the tunable passband filter, with or without intermediate ferrite resonators, to another ferrite resonator located in the output portion fo the tunable passband filter. To achieve a large coupling coefficient, the resonators should be spaced as close as possible. However, such close spacing produces spurious magnetostatic mode responses caused by the non-uniform magnetic fields created by the close presence of two or more ferrite resonators which are directly coupled to each other. Furthermore, the coupling coefficient decreases as the operating frequency increases.

It is the object of this invention to provide a bandpass filter incorporating ferrites in an arrangement such that excellent transmission of microwave energy is achieved within a desired pass band while suppressing or eliminating the transmission of both microwave energy at undesired or unwanted frequencies and magnetostatic mode responses caused by the non-uniform fields of nearby ferrite bodies.

More particularly, it is a feature of the invention to provide a bandpass filter utilizing ferrites which are not directly coupled but are, on the other hand, coupled indirectly through a coupling network which eliminates the aforementioned spurious responses.

Additionally, it is a feature to provide a ferrite coupling network which enables a large coupling coefficient to be achieved without the necessity for close spacing between the ferrite elements.

In accordance with another feature of the invention, the coupling network is arranged to provide a coupling coefficient which varies with frequency in a controllable fashion so that the bandwidth of the filter varies in a prescribed manner.

Specifically, a feature is the provision of a coupling network whose bandwidth can be maintained substantially constant over its operating frequency range.

It is yet a further feature of this invention to provide a bandpass filter having ferrite resonators located in optimum coupling positions relative to the input and output lines.

Particularly, it is a feature of the invention to provide a bandpass filter including terminated strip-transmission lines in the input and output portions thereof, which lines are, in turn, coupled through utilization of additional strip-transmission line sections between the ferrite resonators.

Additionally, it is a feature to provide an arrangement for effectively coupling electromagnetic energy between strip-transmission lines by positioning the strips in overlapping relationship with a ferrite resonator sandwiched therebetween.

These and other objects and features of the invention will be apparent from the following description of the exemplary embodiments shown in the accompanying drawing. It is to be understood, however, that the specific embodiments are shown by way of illustration only, to make the principles and practice of the invention more readily comprehensible, and without any intent of limiting the invention to the specific details therein shown.

Briefly described, this invention relates to a bandpass filter containing an input portion which include a short-circuit-terminated strip-transmission line adapted to receive radio-frequency energy and arranged so that radio-frequency fields are supported therein. An output portion is also provided with a short-circuit terminated strip-transmission line arranged to support radio-frequency fields and adapted to deliver radio-frequency energy therefrom. Coupling means for coupling electromagnetic energy from the input portion to the output portion include a first ferrite resonator located in a region of high magnetic field in the input portion and a second ferrite resonator similarly located in the output portion. The coupling means also include similar coupling sections for coupling electromagnetic energy away from the first ferrite resonator and to the second ferrite resonator together with an impedance inverter joining the coupling sections.

Figures 1, 2, 3:
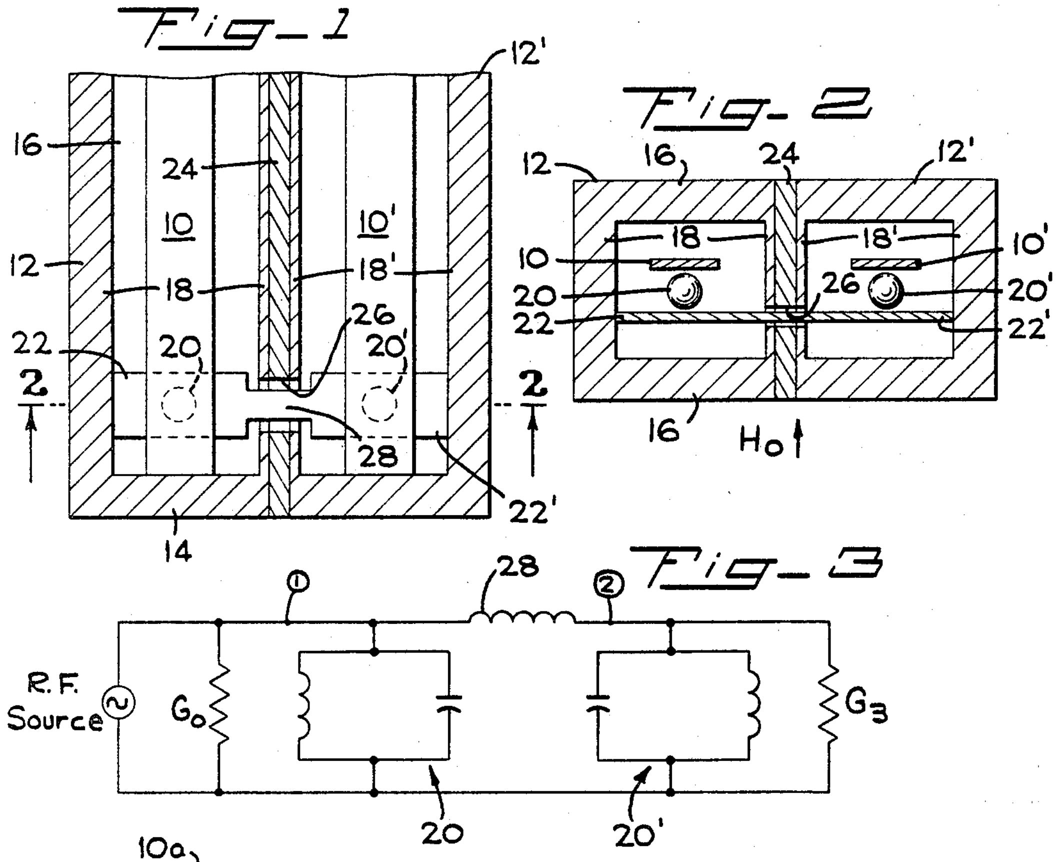
FIGURE 1 is a fragmentary top view of one bandpass filter embodying the present invention with portions of the structure being broken away to illustrate interior details thereof.
FIGURE 2 is a transverse sectional view taken along the line 2—2 of FIGURE 1.
FIGURE 3 is a schematic diagram of the equivalent electrical circuit of the embodiment of FIGURE 1.

Referring initially to FIGURES 1 and 2, a bandpass filter arranged for connection to input and output coaxial transmission lines (not shown) is illustrated, details of such connection being described in the aforementioned application, Ser. No. 365,990. The central conductor of the input coaxial transmission line is electrically and physically connected to a copper strip 10 which extends through the interior of hollow body member 12 and is connected at its remote extremity to the end wall 14 thereof. Since the end wall 14 is physically joined to the top and bottom walls 16 and side walls 18 of the body member 12 which are, in turn, connected to the outer conductor (not shown) of the coaxial transmission line, the strip transmission line formed by the copper strip 10 and the body member 12 is short circuited. The dimensions of the strip 10 and the walls 16 and 18 of the body member 12 are chosen to match the impedance of the input coaxial line to avoid reflections.

A ferrite resonator 20, preferably a sphere of yttrium ion garnet (YIG), of the type described in the aforementioned patent application, Ser. No. 365,990, is supported in the body member 12 at the end of a dielectric mounting rod (not shown). The ferrite resonator 20 is preferably centrally positioned near one end of the body member 12 and sandwiched between the strip 10 and a coupling section 22 which takes the form of a strip-transmission line including a strip 22 in a plane parallel to the strip 10 but extending from the side wall 18 at right angles to the strip 10. More particularly, the ferrite resonator 20 is located centrally between the overlapping portions of the strip 10 and the coupling section 22. In this manner, the ferrite resonator 20 is positioned for maximum coupling to both strips 10, 22. Preferably, in order to achieve such coupling over the relatively large band of frequencies within the tuning range of the filter, the overlapping position of the strips 10, 22 is less than ⅛ wavelength from the short-circuit termination of each strip at the center operating frequency.

The output portion of the filter is of substantially identical construction and the elements thereof are accordingly indicated by like reference numerals with an added prime notation. The output portion is similarly arranged for connection to an output coaxial line (not shown). A brass dividing wall or septum 24 is disposed between the input and output portions. An aperture 26 located in septum 24 is in registry with similar size apertures located in side walls 18 and 18' to permit communication between body members 12 and 12'. The strips forming the coupling sections 22, 22' are joined at the aperture 26 and are cut away to form an inductive section which provides the mentioned impedance inverter indicated at 28. Accordingly, the impedance inverter of FIGURES 1 and 2 is a high impedance strip-line section which provides the desired electrical transformation characteristics for the electromagnetic energy that is coupled from the input portion to the output portion of the filter. However, at the same time the inverter 28, as described and arranged in FIGS. 1 and 2 provides means for isolating the ferrite resonators so that no direct electromagnetic coupling exists.

To explain the function of the impedance inverter 28, reference is made to FIGURE 3 which is an equivalent circuit diagram of the embodiment of FIGURES 1 and 2. The equivalent circuit of any narrow band, bandpass filter can be reduced to a ladder network of series and parallel resonators wherein the shunt elements are parallel-resonant circuits and the series elements are series-resonant circuits. To construct a bandpass filter from the identical ferrite resonators 20, 20' hereinabove described, which are, equivalently, parallel resonant circuits, an impedance transformation (inversion) is necessary to transform the parallel-resonant (series-resonant) circuit branch into a series-resonant (parallel-resonant) circuit branch before connecting it to the next resonant element. More particularly, the equivalent circuit of the two resonator YIG filter structure shown in FIGURES 1 and 2 indicates that the impedance elements are those seen looking back toward the input and the output from points 1 and 2. The coupling circuit is represented by an admittance inverter $J_{12}$ where $J_{12}$ is defined by $$Y_1=\frac{J_{12}^2}{Y_2} \tag{1}$$

where $Y_1$=admittance looking into input
$Y_2$=admittance connected to output

The coupling coefficient $k_{12}$ between the two resonators is related to the circuit response parameters as follows:

$$k_{12}=\frac{I_{12}}{\sqrt{b_1 b_2}} \tag{2}$$

where $b_1$, the susceptance slope parameter of resonator No. 1

$$=\frac{G_0 g_0 g_1 \omega'_1}{w} \tag{3}$$

and $$b_2=\frac{G_3 g_2 g_3 \omega'_1}{w} \tag{4}$$

where $G_0$=conductance coupled into resonator No. 1 from source resistance
$G_3$=conductance coupled into resonator No. 2 from load resistance
$w$=fractional bandwidth=$(f_2-f_1)/\sqrt{f_2 f_1}$
$\omega'$=cutoff frequency of normalized low-pass prototype and
$f_1, f_2$=cutoff frequencies of bandpass response
$g_0 g_1 g_2 g_3$=element values of equivalent low-pass prototype filter The external Q's of the resonators are related to the response parameters as follows:

$$(Q_e)_A=\frac{g_0 g_1 \omega'_1}{w} \tag{5}$$

$$(Q_e)_B=\frac{g_2 g_3 \omega'_1}{w} \tag{6}$$

Substituting Equations 5 and 6 into Equation 2 together with the relations given above for $b_1$ and $b_2$ the resulting equation for $k_{12}$ is $$k_{12}=\frac{J_{12}}{\sqrt{G_0 G_3 (Q_e)_A (Q_e)_B}}=\frac{J_{12} w}{\omega'_1 \sqrt{G_0 G_3 g_0 g_1 g_2 g_3}} \tag{7}$$

$k_{12}$ is given in terms of the equivalent circuit parameters by the following expression:

$$k_{12}=\sqrt{\frac{w}{\omega'_1 \sqrt{g_1 g_2}}} \tag{8}$$

Equating Equations 7 and 8 provide the following definition for $J_{12}$:

$$J_{12}=\sqrt{G_0 G_3 g_0 g_3}$$

Therefore, it can be seen that the admittance inverter $J_{12}$ depends on the admittance values $G_0$ and $G_3$. These admittances are determined by the strength of the coupling of the ferrite resonatods 20, 20' to the coupling sections 22, 22' in the input and the output portions of the filter. Since the coupling coefficient $k_{12}$ is by the Equation 7 proportional to $J_{12}/\sqrt{G_0 G_3}$, $J_{12}$, which is the admittance inverter, can be used to adjust the coupling between the ferrite resonators while leaving the coupling from the external circuit to the resonator constant. Hence, the spacing between and the location of the ferrite resonators 20, 20' in the input and the output portions of the filter, respectively, can be maintained fixed which thus eliminates the time consuming coupling adjustments which were necessary with prior art filters. Only the impedance inverter 28 need be adjusted to vary the electromagnetic coupling between the input and the output portions of the filter.

In order to tune the described filter, both ferrite resonators 20, 20' are immersed in the same magnetic field indicated at $H_0$ in FIG. 2 and generated by the polepieces of an electromagnet (not shown) positioned above and below the filter. As the strength of the magnetic field, $H_0$, is varied, the resonant frequency of the ferrite resonators 20, 20' varies in a known fashion to, in turn vary the pass band of the filter from one frequency range to another.

If inductive coupling, as shown in FIGS. 1 and 2 is utilized, the bandwidth of the filter over the entire tuning range can remain substantially constant. In one example, using an inductive impedance inverter 28, as shown in FIG. 3, with the value of $$G_0=G_3=0.05 \text{ and } \sqrt{g_0 g_3}=1$$

(for maximally flat response)
then $$J_L=(\omega L_C)^{-1}=\sqrt{G_0 G_3 g_0 g_3}=0.05$$

A short length, $l$ of 100 ohm transmission line $(Z_0)$ is specifically chosen for the inductance $L_c$. Since $L_c$ is approximately equal to $$\frac{Z_0\beta l}{\omega}$$

which is equal to $Z_0\beta l$ which is in turn equal to $$\frac{Z_0\left(\frac{2\pi l}{\lambda}\right)}{\omega}$$

it follows that, for the chosen structure, $$l=\frac{\omega L_c\lambda}{2\pi Z_0}=\frac{20\lambda}{2\pi(100)}=0.032\lambda$$

Figures 4, 5:
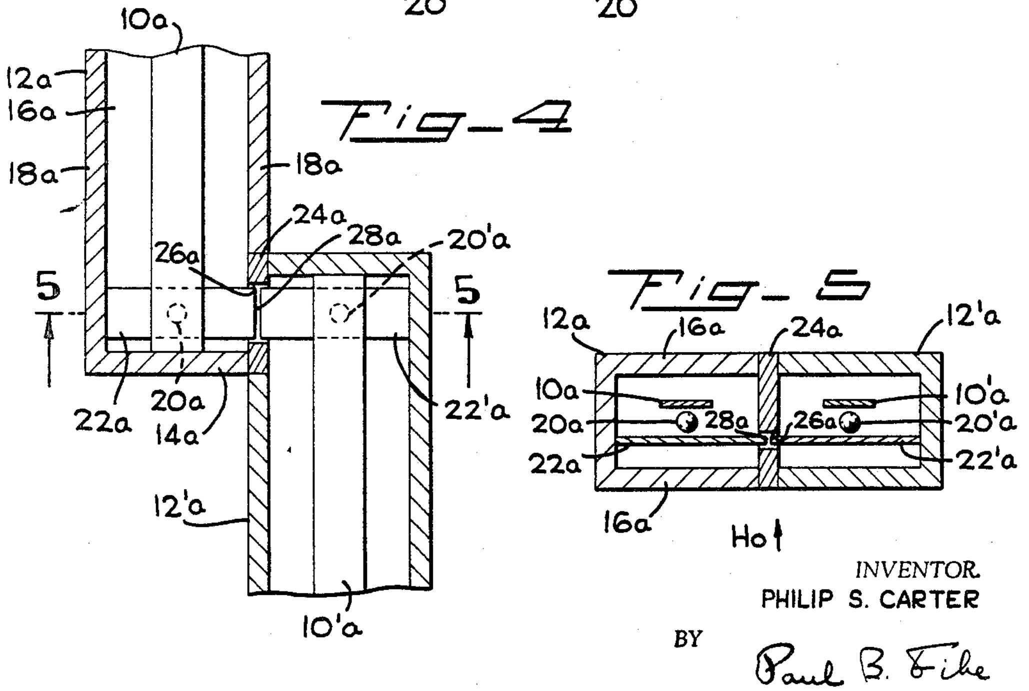
FIGURE 4 is a fragmentary top view of another embodiment of the invention, portions thereof being broken away to illustrate interior details.
FIGURE 5 is a transverse sectional view taken along the line 5—5 of FIGURE 4.

Referring to FIGURES 4 and 5, another embodiment is shown utilizing a gapped transmission line or C (capacitive) type of impedance inverter 28*a*, the structure being otherwise similar to that shown in FIGS. 1 and 2 so that similar numbers are used to designate the same parts except for the use of the additional letter "*a*," and description thereof will not be repeated.

In an example, using the same given values as used in the inductive example, the capacitive-type admittance inverter, 28*a* provides:

$$J_c=\omega C_c=0.05$$

The size of the capacitor required to provide the value of coupling capacity required at 3 gigacycles is similarly calculated to give:

$$C_c=2.66\times10^{-12}\text{ farads}$$

Obviously, various modifications in the method and exemplary apparatus described hereinabove can be made without departing from the spirit of the invention, and the foregoing description is to be considered purely for exemplary purposes, and not in a limiting sense. For example, although but two resonators are coupled in the described embodiments of the invention, multiple resonators can be coupled in a similar fashion if requisite for the desired filter characteristics. The actual scope of the invention is to be indicated only by reference to the appended claims.

What is claimed is:

1. A bandpass filter comprising, in combination, an input portion adapted to receive radio-frequency energy and arranged so that electromagnetic fields are established therein, an output portion arranged to support radio-frequency fields and adapted to deliver radio-frequency energy therefrom, and coupling means for coupling energy from said input portion to said output portion, said coupling means comprising first and second ferrite resonator means exposed to said radio-frequency fields in a region of high magnetic field strength in said input and output portions, respectively, serial coupling sections for coupling electromagnetic energy away from said first resonator means and to said second ferrite resonator means, and an impedance inverter connected between said coupling sections to indirectly couple said resonator means whereby no direct coupling exists therebetween.

2. A bandpass filter in accordance with claim 1, in which said impedance inverter comprises an inductive element electrically connected to said coupling sections.

3. A bandpass filter in accordance with claim 1, in which said impedance inverter comprises a capacitive element joining said coupling sections.

4. A bandpass filter in accordance with claim 2, in which said coupling sections each include a conductive strip located adjacent to said ferrite resonator means.

5. A bandpass filter according to claim 4, in which said ferrite resonator means comprises two ferrite resonators, one of said two ferrite resonators being located in said input portion, the other of said two ferrite resonators being located in said output portion, means for isolating ferrite resonators to prevent direct electromagnetic coupling between said two ferrite resonators.

6. A bandpass filter according to claim 5, in which means are provided for applying a variable direct-current magnetic field to each one of said two ferrite resonators.

7. A bandpass filter according to claim 6, in which said coupling means includes a coupling aperture joining said input and output portions and having dimensions such that substantially no direct coupling of the radio-frequency fields exists.

8. A bandpass filter comprising, in combination, an input portion including a terminated strip transmission line adapted to receive radio-frequency energy and arranged so that radio-frequency fields are supported therein, an output portion including a terminated strip transmission line arranged to support radio-frequency fields and adapted to deliver radio-frequency energy therefrom, and coupling means for coupling energy from said input portion to said output portion, said coupling means including a first ferrite resonator in said input portion in a region of high magnetic field, a second ferrite resonator in said output portion, coupling means for coupling electromagnetic energy away from said first ferrite resonator to said second ferrite resonator, and including an impedance inverter located between said first and second ferrite resonators.

9. A bandpass filter according to claim 8, in which said coupling means comprises a first strip-transmission line section located adjacent to said first ferrite resonator, and a second strip-transmission line section located adjacent to said second ferrite resonator, said impedance inverter being located between said first and second strip-transmission line sections.

10. A bandpass filter according to claim 9, in which said impedance inverter comprises a strip-transmission line section having an impedance greater than the impedance of each of said first and second strip-transmission line sections.

11. A bandpass filter according to claim 10, in which said first ferrite resonator is centrally disposed between said terminated strip-transmission line in said input portion and said first strip-transmission line coupling section, and said second ferrite resonator is centrally disposed between said terminated strip-transmission line in said output portion and said second strip-transmission line coupling section.

12. A bandpass filter according to claim 11, in which said first strip-transmission line coupling section is spaced from and is disposed at right angles with respect to said terminated strip-transmission line in said input portion, said second strip-transmission line coupling section is spaced from and disposed at right angles with respect to said terminated strip-transmission line in said output portion.

13. A bandpass filter comprising, in combination, an input portion adapted to receive radio-frequency energy and arranged so that electromagnetic fields are established therein, a first ferrite resonator located in said input portion in a region of high magnetic field, an output portion arranged to support radio-frequency fields and adapted to delivery radio-frequency energy therefrom, a second ferrite resonator located in said output portion, and series coupling means including an impedance inverter for indirectly transmitting electromagnetic energy from said first resonator in said input portion to said second resonator in said output portion of the filter whereby no direct coupling exists between said resonators.

14. Apparatus for coupling electromagnetic energy which comprises first and second strip transmission lines having strips arranged in spaced overlapping relation, a ferrite resonator disposed between said strips at the overlapping position, each of said strips being terminated at positions closely adjacent the overlapping position so that maximum coupling to both strips results, said strips being terminated at a position spaced from the overlapping position by less than 1/8 wave length at the center operating frequency.

References Cited

UNITED STATES PATENTS

| | | | |
|---|---|---|---|
| 3,016,495 | 1/1962 | Tien | 330—56 |
| 3,022,466 | 2/1962 | Weiss | 330—4.8 |
| 3,058,070 | 10/1962 | Reingold | 333—9 |
| 3,128,439 | 4/1964 | Brown | 333—24.2 |
| 3,200,353 | 8/1965 | Okurt | 333—83 |
| 3,268,838 | 8/1966 | Matthei | 333—73 |
| 3,290,625 | 12/1966 | Bartram et al. | 333—73 |

OTHER REFERENCES

IRE-Int'l Convention Record, Part 3, pp. 130–135, 1960 (Carter).

HERMAN KARL SAALBACH, *Primary Examiner.*

C. BARAFF, *Assistant Examiner.*